April 24, 1934.  B. N. WALLIS  1,956,480
APPARATUS FOR ASSEMBLING AND SECURING BRACING MEMBERS ON TUBULAR MEMBERS
CONSTITUTING THE SPARS OF AIRCRAFT OR OTHER STRUCTURES
Filed Sept. 5, 1933  4 Sheets-Sheet 1

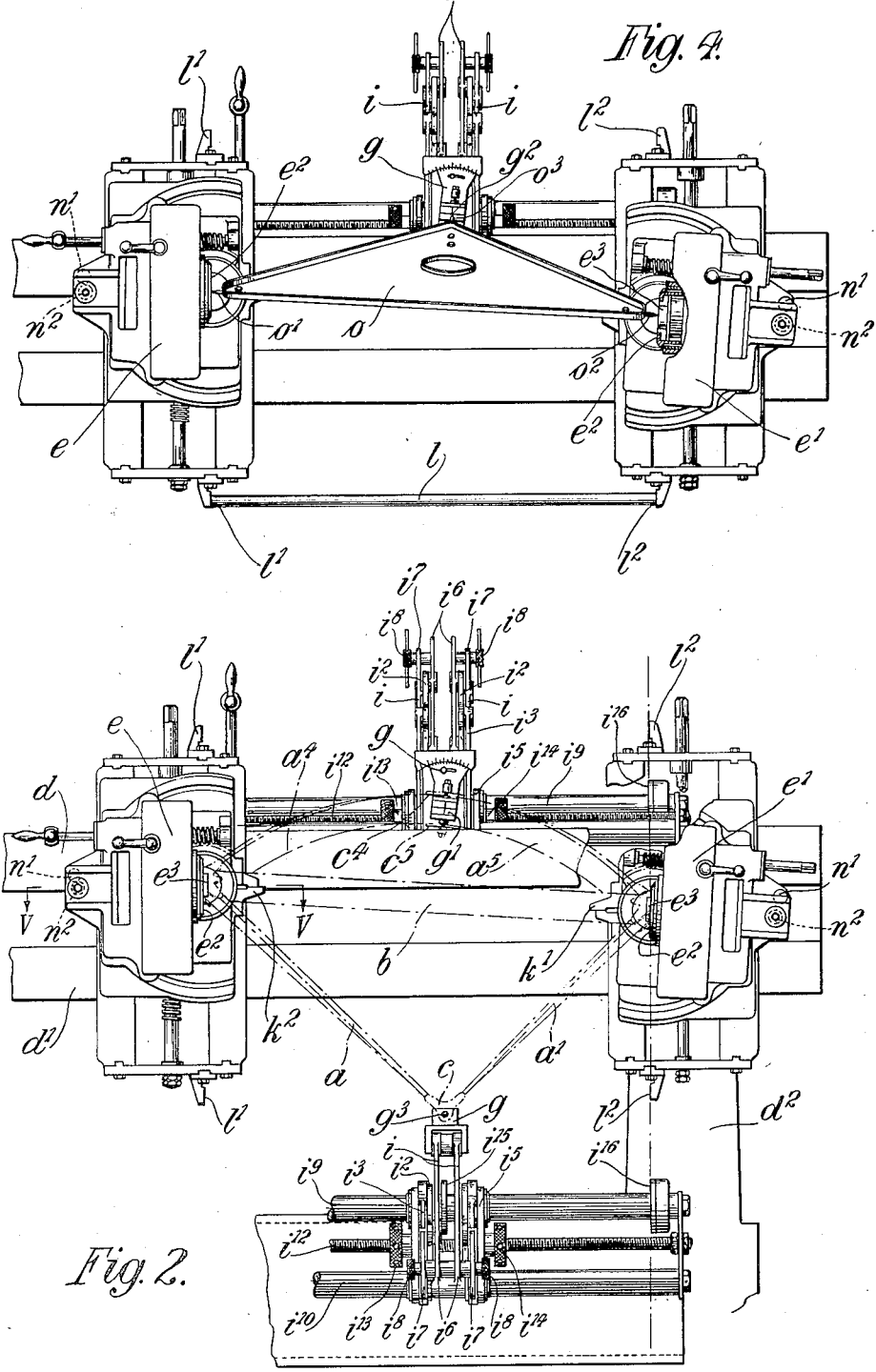

April 24, 1934. B. N. WALLIS 1,956,480
APPARATUS FOR ASSEMBLING AND SECURING BRACING MEMBERS ON TUBULAR MEMBERS
CONSTITUTING THE SPARS OF AIRCRAFT OR OTHER STRUCTURES
Filed Sept. 5, 1933 4 Sheets-Sheet 3
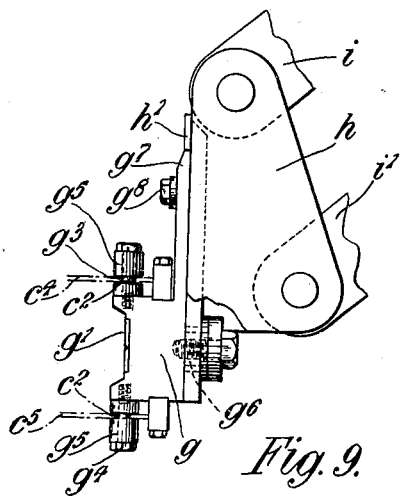
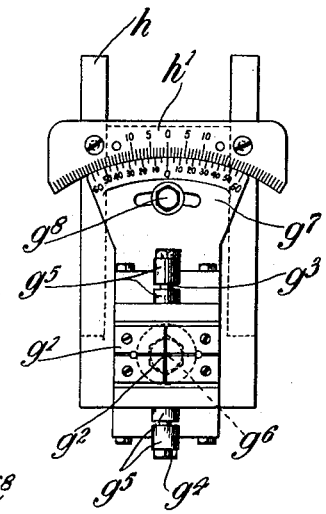
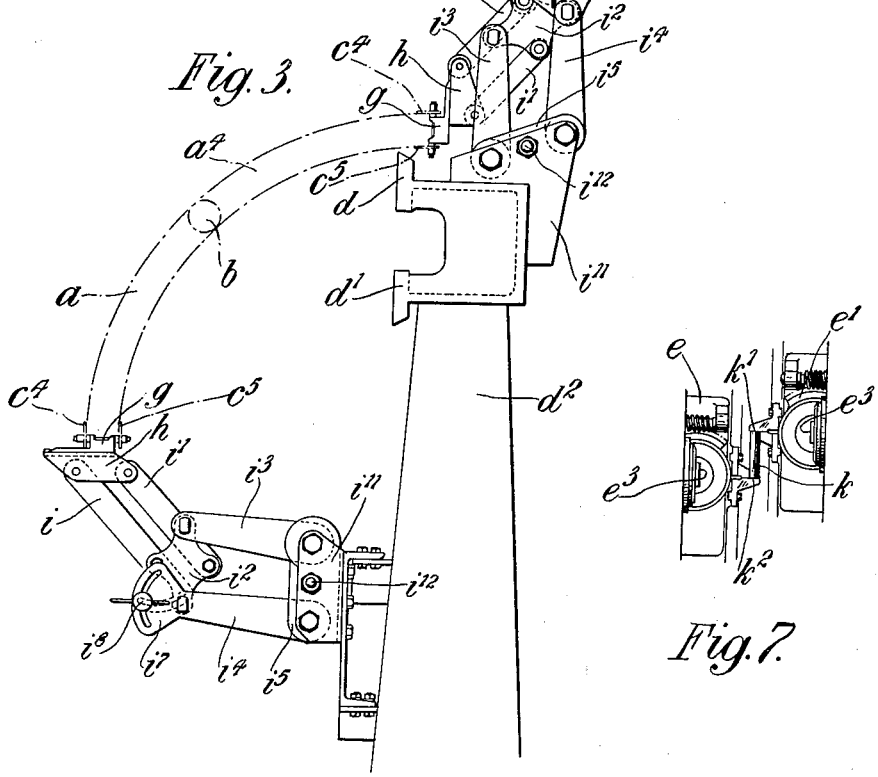
Barnes Neville Wallis
Inventor April 24, 1934.  B. N. WALLIS  1,956,480
APPARATUS FOR ASSEMBLING AND SECURING BRACING MEMBERS ON TUBULAR MEMBERS
CONSTITUTING THE SPARS OF AIRCRAFT OR OTHER STRUCTURES
Filed Sept. 5, 1933  4 Sheets-Sheet 4
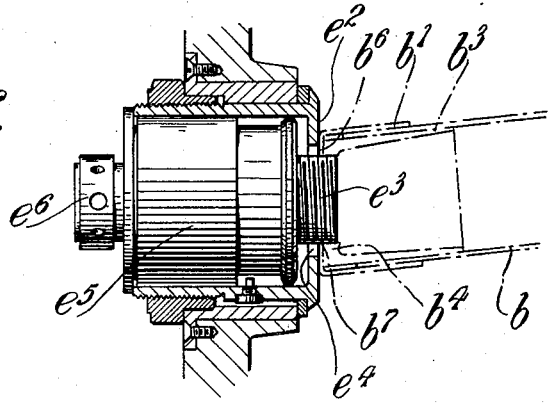
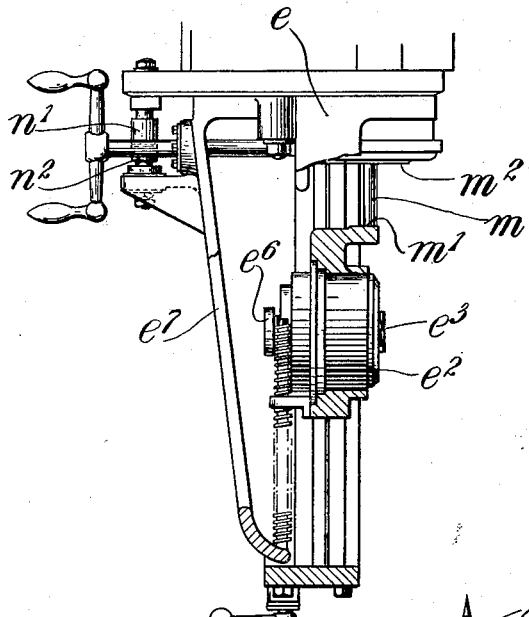
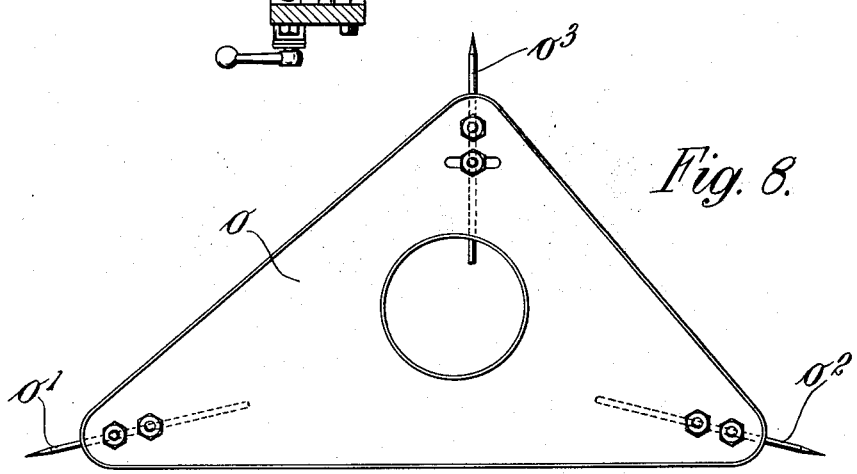

Patented Apr. 24, 1934

1,956,480

UNITED STATES PATENT OFFICE 1,956,480

APPARATUS FOR ASSEMBLING AND SECURING BRACING MEMBERS ON TUBULAR MEMBERS CONSTITUTING THE SPARS OF AIRCRAFT OR OTHER STRUCTURES

Barnes Neville Wallis, Weybridge, England, assignor to Vickers (Aviation) Limited, Weybridge, England Application September 5, 1933, Serial No. 688,230
In Great Britain October 14, 1932

11 Claims. (Cl. 29—89)

This invention relates to apparatus for assembling and securing bracing members on tubular members adapted to constitute parts of the spars of aircraft and other structures.

In United States Patent No. 1,894,011 dated 10th January 1933 is described a construction of fuselage or other bodies of cylindrical, elliptical or other curved section in which the bracing members are formed with their exterior borders as geodesics in or parallel to the contour which it is desired to secure for the structure, said bracing members having a greater radial depth than width and being secured together where they intersect, so that the tendency of one bracing member to bend outwards under endwise compressive forces is balanced by the tendency of the opposed bracing member to bend inwards under endwise tensile forces. These bracing members are preferably constructed in separate halves which converge and have their axes meeting at a point where they are interconnected by a fitting, the opposite ends being fixed to the ends of the tubular members by gusset plates. In such a construction, difficulties occur in assembling the converging bracing members and to overcome these difficulties and to facilitate and expedite erection, it is proposed to assemble the bracing members which are fixed to said tubular members prior to the assembly of said tubular members to form the fuselage, in order to form units of construction comprising the tubular members, bracing members and means for connecting the bracing members on one tubular member to continuing bracing members on another tubular member.

According to this invention the apparatus comprises end holding devices for the tubular member and gusset plates, a holding device for the fitting, said holding devices being relatively adjustable and having means for fixing the adjustable devices in any adjusted position, and gauge faces on said devices by which they can be set to a predetermined relative position.

In order to be able conveniently to determine the relative setting of the holding devices, use is made of a gauge consisting of a triangular plate having adjustably mounted at its corners three pointers which can be set to the required positions as determined by the working drawings, and this gauge can then be used in conjunction with the gauge faces on the holding devices to enable these to be brought into the required positions.

The apparatus for assembling and securing the bracing members is preferably combined with the apparatus for assembling and securing strengthening sleeves to the ends of the tubular members described in United States Patent No. 1,891,127, in which two face plates having means for supporting strengthening sleeves with their terminal flanges flush with said face plates are mounted on means for effecting relative three dimensional rectilinear adjustment between the face plates to change their relative inclination. In this combination, the fitting holder is so mounted by parallel linkage mechanism on the frame of the apparatus as to move in a vertical plane, said holder having a face plate inscribed with a datum line coinciding with said plane and a datum line at right angles to said plane, said lines intersecting at a point representing the centre of the fitting, whereby the position of this centre can be determined and the holder fixed in this position. In order to determine the position of said centre the setting gauge consisting of the triangular plate having pointers adjustably fixed at its three corners is used, said pointers being set to the predetermined distances between the centres of the terminal flanges on the sleeves and between these centres and the centre of the fitting. In use this setting gauge is set with the two pointers at its base at centre points of the face plates for the strengthening sleeves, then the setting gauge is swung about an axis joining said points and the holder for the fitting is moved about an horizontal axis until these are brought into a position where the pointer at the apex of the setting gauge and the centre of the fitting holder coincide. This gives the required position for the fitting holder. The fitting is then fixed on its holder and the strengthening sleeves and tubular member, to which is fixed the end gusset plates, are then assembled in the set positions and secured together. Finally, the bracing members, consisting of channel members cut to the predetermined length, are fitted to the gusset plates and to the fitting, where holes are drilled through said parts which are fixed together by temporary pins. When so fixed the tubular member, bracing members and fitting are removed.

Two of such fitting holders are provided, one for the fitting interconnecting bracing members which project from one side of the tubular member and the other for bracing members which project from an approximately opposite side of the tubular member. Thus the whole of the bracing members to be fixed to each tubular member are applied in one assembling operation and a unit of construction is obtained.

In the case of a four-boom fuselage, four of said units are assembled for each cellular bay of the structure, each unit embracing a quadrant of the circular section, the bracing members of the different units being fixed together by the fittings.

With a structure in which the contour is not parallel but is tapered or irregular, it is desirable that the exterior surfaces of the fitting should be so disposed as to lie in or parallel to said contour. To obtain this the fitting holder is angularly adjustable and this adjustable holder is marked with a scale of degrees which is movable relative to a similar fixed scale by which the holder can be set to the predetermined angle of taper of the exterior contour.

The fitting holder is mounted on two pairs of arms, one of which allows horizontal parallel adjustment and the other of which allows vertical parallel adjustment, so as to provide two dimensional movements of the holder in a single vertical plane. One of the arms in each pair is conveniently formed with an integral slotted quadrant. These slotted quadrants overlap and through both of them is passed the pin of a locking device by which said quadrants can be locked together in order that the holder may be fixed in any adjusted position.

In the apparatus described in United States Patent No. 1,891,127, the two face plates for the strengthening sleeves are each carried by headstocks, one of which is adjustable along the bed relatively to the other, gauge faces being provided for the reception of templates by which the distance between the face plates is determined. With this arrangement it is necessary to adjust the position of the fitting holder along the bed. To this end the parallel linkage mechanism is carried by bearings pivotally and slidably mounted on two spaced shafts, the bearings on said shafts being interconnected by two plates through which passes a fixed screwed shaft carrying two adjusting heads, arranged one on either side of said plates by which the plates and bearings can be accurately adjusted and clamped in any adjusted position. On one of said bearings a gauge flange is formed which, with an opposed gauge face fixed on a bracket carrying one end of said shafts in alignment with the gauge face on the fixed headstock, enables the predetermined distance between the centre of the face plate for the strengthening sleeve and plane containing the centre of the fitting to be set off by means of a setting gauge or template.

A practical embodiment of the apparatus for assembling and securing the bracing members combined with means for assembling and securing strengthening sleeves to the ends of tubular members will now be described with reference to the accompanying drawings, in which:—

Fig. 2 is an elevation of the erection jig according to this invention, whereby the assembling of the tubular members on the strengthening sleeves and the assembling of the bracing members on the tubular members is effected.

Fig. 3 is a side elevation of the erection jig.

Fig. 4 shows a fragmentary elevation of the erection jig illustrating the method of setting the fitting holder in the required position.

Fig. 5 is a part sectional view on the line V—V in Fig. 2.

Fig. 6 is a part sectional view of one of the face plates showing the means for registering the position of the strengthening sleeves and gusset plates.

Fig. 7 is a fragmentary view showing the method of gauging the vertical separation of the two face plates.

Fig. 8 is a side view of the gauge used to effect the setting in Fig. 4.

Figs. 9 and 10 are a side elevation and front elevation respectively of the fitting holder drawn to an enlarged scale.

Figure 1:
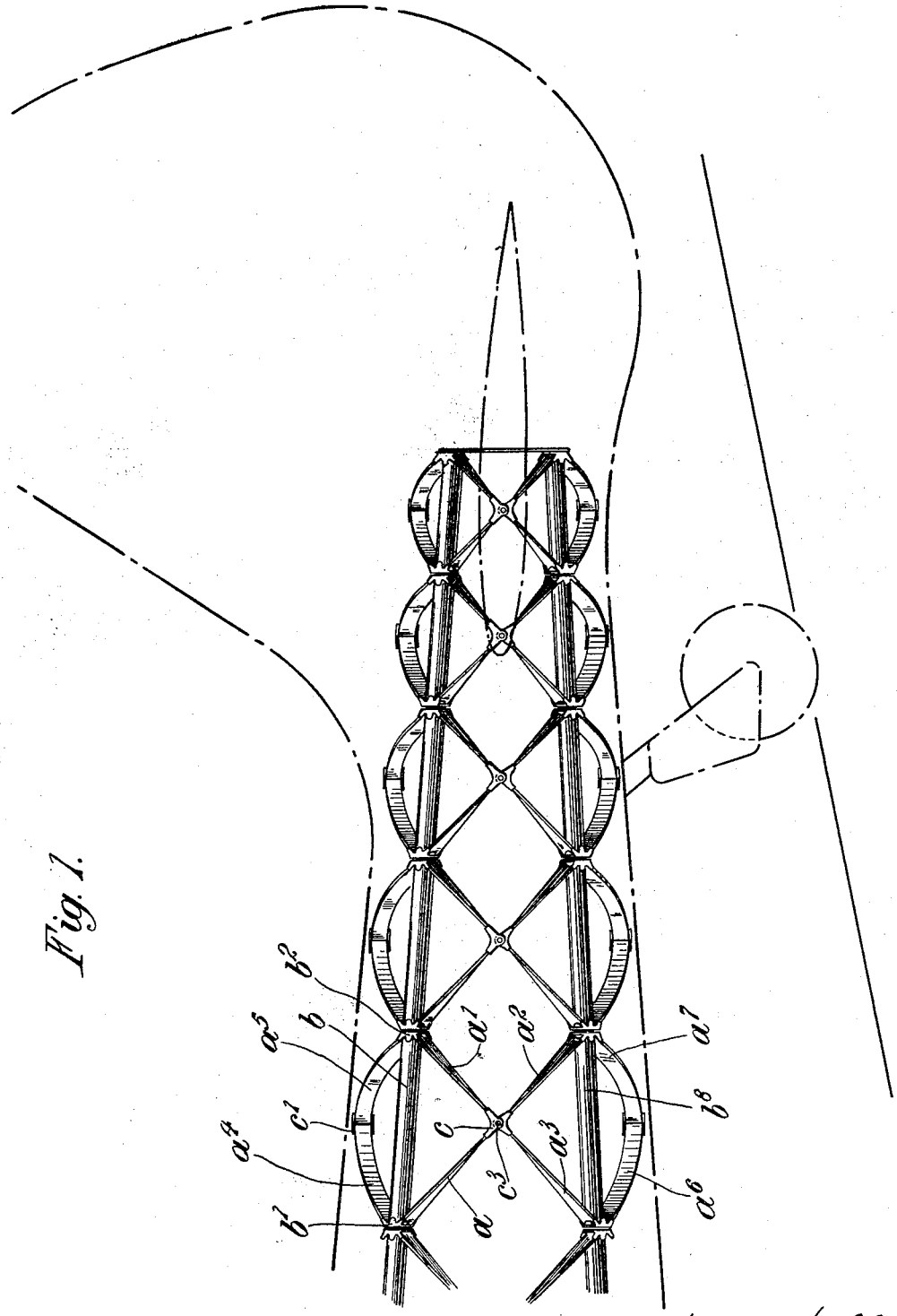
Fig. 1 is a side elevation of the tail end of a fuselage structure showing the bracing members and tubular members assembled.

As shown in Fig. 1, the opposed bracing members $a$, $a^1$ are to be so assembled on the tubular member $b$ as to form geodesics with respect to the contour which it is desired to secure for the fuselage. For the convenience of erection, the bracing member $a$ is formed separately from the continuing bracing member $a^2$ and the bracing member $a^1$ is similarly formed separately from the bracing member $a^3$. The bracing members $a$ and $a^1$ are fixed together by a fitting $c$, and are fixed to the tubular member by means of gusset plates $b^1$, $b^2$ which also serve to fix to the tubular member a further set of bracing members $a^4$, $a^5$ extending at the opposite side of the tubular member to that of the members $a$, $a^1$. The members $a^4$, $a^5$ have their ends fixed to a fitting $c^1$. The bracing members $a$, $a^1$, $a^4$, $a^5$, together with the tube $b$ and the gusset plates and fittings form a unit of construction and it is this unit of construction which is to be assembled in accordance with the present invention.

The bracing members $a^2$, $a^3$, $a^6$ and $a^7$, together with the tubular member $b^8$ on which these are fixed and their gusset plates and fittings, constitute a further unit of construction and the fittings are provided with overlapping portions having a hole $c^2$ for a jointing pin $c^3$, by which the units are fastened together.

The strengthening sleeves $b^3$, fitting in the tubular members as shown in Fig. 6, are formed with terminal flanges $b^4$ arranged at an angle to the axis of the tubular members, according to the taper of the structure and internally screw threaded. The gusset plates $b^1$ are each bent to the form of a U-shaped member having a middle portion forming a flat face $b^6$ for the gusset plate, extending across the terminal flange on the strengthening sleeve and preformed to a suitable shape so that the angle of its flat face $b^6$ will agree with that of the flange on the strengthening sleeve, said flat face being provided with a hole $b^7$.

The assembling of each unit is effected by means of the erection jig shown in Figs. 2-7 and comprising a bed which consists of two horizontal guides $d$ and $d^1$ carried on two spaced vertical supports, only one of which is shown and marked $d^2$ and two headstocks $e$ and $e^1$, one of which $e^1$ is non-adjustable longitudinally in relation to the bed of the machine and the other $e$ of which is mounted to slide along said bed. Means described in United States Patent No. 1,891,127 are provided for adjusting the movable headstock $e$ along the guides relatively to the other headstock $e^1$; for independently moving said headstocks vertically and horizontally relatively to said bed and also for moving said headstocks angularly about an axis through the centre of its face at right angles to the plane of the bed.

The two headstocks are of the same construction. Each headstock carries a face plate $e^2$ provided with a screwed plug $e^3$ for engaging the internal screw threaded strengthening sleeve $b^3$ as shown in Fig. 6. As illustrated in this figure, the screwed plug is adapted to project through the aperture $e^4$ in the face plate $e^2$ and is carried by a drum $e^5$, the rear face of which is provided with a boss $e^6$ by the turning of which the screwed plug $e^3$ may be adjusted so as to draw the strengthening sleeve $b^3$ towards the face plate $e^2$ until the flat face $b^6$ of the gusset plate is flush with the face of the plate $e^2$.

The fitting holder $g$ comprises a rectangular block having a gauge face $g^1$ inscribed with lines at right angles to each other and intersecting at a point $g^2$ which represents the centre of the fitting. This block carries upper and lower screwed studs $g^3$, $g^4$ each carrying distance pieces $g^5$ between which the plates $c^4$, $c^5$, comprising the fitting $c^1$, are clamp with the studs $g^3$ and $g^4$ passing through the hole $c^2$ in said plates. The block $g$ is mounted by means of a pivot $g^6$ on a carrier $h$ so that this fitting holding block is adjustable about an axis passing through the point $g^2$ and extending at right angles to the datum plate. A segmental projection $g^7$ is formed on the block $g$, and a plate $h^1$, shaped to correspond with the segmental block, is fixed on the carrier $h$, these parts $g^7$ and $h^1$ being graduated to serve as a vernier gauge for accurately determining the angular adjustment of the block $g$ relatively to the carrier $h$. The carrier $h$ is pivotally mounted on the ends of a pair of arms $i$, $i^1$, the other ends of which arms are pivoted to a plate $i^2$, which in turn is pivotally carried on the ends of a pair of arms $i^3$, $i^4$ pivoted to a carriage $i^5$ on the bed of the machine. The arms $i$, $i^1$, $i^3$, $i^4$ and the plate $i^2$ are duplicated. The arms $i$, $i^1$ allow vertical parallel adjustment of the carrier $h$ while the arms $i^3$, $i^4$ allow horizontal parallel adjustment of said carrier and thus those arms permit of two dimensional movements of the holder in a single vertical plane. The arm $i$ is formed with an integral slotted quadrant $i^6$ and the arm $i^4$ is formed with an integral slotted quadrant $i^7$, these quadrants overlapping and having a locking device $i^8$ passing through them, whereby the links may be locked together in any adjusted position.

The carrier $i^5$ is mounted to slide along the cylindrical supports $i^9$, $i^{10}$ mounted by a bracket $i^{11}$ at each end of the bed and a screw $i^{12}$ is provided between the cylindrical supports on which there is mounted screw adjusting devices $i^{13}$ and $i^{14}$, which permit of the carriage being accurately adjusted along the cylindrical supports and locked in any adjusted position.

In setting the headstocks before the strengthening sleeves, tubular members and other parts are applied to these, the headstocks are first brought into the position in which the face plates are close together, as shown in Fig. 7, where the headstocks are offset vertically from each other by the required amount, as determined by a gauge $k$ in Fig. 7 set between the gauge faces $k^1$ and $k^2$ on the headstocks $e$ and $e^1$ respectively. The adjustable headstock is then traversed longitudinally of the bed and the headstocks thus separated by the required amount as determined by a gauge $l$ engaging between the gauge faces $l^1$, $l^2$, as shown in Fig. 4. Adjustment in the third linear dimension can then be effected by adjusting the face plate $e^2$ on one of the headstocks horizontally towards or away from the bed as determined by the gauge $m$ in Fig. 5 extending between the gauge face $m^1$ and a fixed part $m^2$ of the headstock.

The face plates are also adjustable angularly about an axis at right angles to the bed and passing diametrically across the front of the face plate, this angular adjustment of each face plate being determined by a gauge (not shown) engaging between a lug $n^1$ fixed on the headstock and a lug $n^2$, fixed on a part $e^7$ carrying the face plate $e^2$, as shown in Fig. 2.

After the headstocks have been set, the carriage $i^5$ carrying the fitting holder, is next adjusted to the required position as determined by a gauge extending between the gauge face $i^{15}$ on the carriage and a gauge face $i^{16}$ on the fixed part of the machine.

After the gauge faces on the headstocks and their two face plates and the carriage of the fitting holder have been moved into the required positions, the screwed plugs $e^3$ are brought into a position flush with the face plates as shown in Fig. 4, and the centre of these screwed plugs then constitute datum points lying at the position of the centre of the end of the tubular members to be erected thereon, from which the position of the fitting holder can now be determined in the manner shown in Fig. 4. For this purpose a triangular gauge constructed as shown in Fig. 8, of a triangular plate $o$ having pointers $o^1$, $o^2$, $o^3$ at the corners thereof, which pointers can be set to required positions for the centres of the ends of the tubular members and the centre of the fitting, as determined by working drawings. When set in this manner the gauge is applied to the face plates shown in Fig. 4 with its pointers $o^1$ and $o^2$ applied to the centres of the screwed plugs, so that the gauge $o$ can be swung about a point joining these centres as an axis. The fitting holder is then adjusted on the arms $i$, $i^1$, $i^3$, $i^4$ in its vertical plane until the pointer $o^3$ intersects the point $g^2$ representing the centre of the fitting. The arms $i$, $i^1$, $i^3$, $i^4$ are then fixed in this position and the gauge $o$ is removed from the machine. Finally the fitting holder will be adjusted angularly about the axis passing through the point $g^2$ and this will be fixed in the required position by the screw $g^8$. When the jig has been set to the required position, the tubular member, strengthening sleeves and gusset plates are brought into position between the two face plates $e^2$ and the gusset plates and strengthening sleeves registered in the required position by screwing the screwed plug $e^3$ into each strengthening sleeve and clamping this strengthening sleeve and the gusset plate flat against the face plate with the face of the gusset plate flush with said face plate. The gusset plates, tubular member and sleeves are then drilled and, if desired, these parts are secured together by temporary holding pins to maintain them in their correct position until they can be secured by permanent rivets. Alternatively, the sleeves and gusset plates after drilling may be permanently secured to the tubular member by rivets while still attached to the face plates. The plates $c^4$ and $c^5$ of the fitting are then fixed in the fitting holder. Then the members which are to form the bracing members and which have been cut to the required size and shape, are taken and are bent and twisted until they are brought into the required position between the gusset plates and between the plates of the fitting, when these are drilled and fixed by temporary fastening devices.

The fitting holders are duplicated as shown in Figs. 2 and 3, these holders being of identical construction, the holder above the bed receiving the fitting $c^1$ of the bracing member $a^4$, $a^5$ which projects at one side of the tubular member $b$, and the holder which is located in front of and below the bed receives the fitting $c$ of the bracing members $a$, $a^1$, which extend in the opposite direction.

In the case of a four boom fuselage structure as illustrated, the bracing members erected on each tube are in the form of a quadrant so that four of said units require to be assembled to form each cellular bay of the structure.

What I claim as my invention and desire to secure by Letters Patent is:—

1. Apparatus for assembling and securing together, converging bracing members the axes of which meet at a point, a fitting at said meeting point tubular members and gusset plates for attachment of the bracing members to the tubular member, comprising end holding devices for the tubular member and gusset plates, said holding devices being relatively adjustable and adapted to be fixed in any adjusted position, a holding device for the fitting, parallel linkage mechanism carrying said fitting holding device adapted to allow two dimensional adjustment of the holding device in a single plane, and gauge faces on said end holding and fitting holding devices by which they can be set to predetermined positions.

2. Apparatus for assembling and securing together, converging bracing members the axes of which meet at a point, a fitting at said meeting point tubular members and gusset plates for attachment of the bracing members to the tubular member, comprising end holding devices for the tubular member and gusset plates, said holding devices being relatively adjustable and adapted to be fixed in any adjusted position and gauge faces on said devices by which they can be set to predetermined positions, a holding device for the fitting, and a face plate on said fitting holding device inscribed with datum lines at right angles to each other, intersecting at a point representing the centre of the fitting, by which said fitting holding device can be set at a predetermined position relative to said end holding devices.

3. Apparatus for assembling and securing together, converging bracing members the axes of which meet at a point, a fitting at said meeting point tubular members and gusset plates comprising, end holding devices for the tubular member and gusset plates which are relatively adjustable, gauge faces on said devices by which they can be set to predetermined positions, a fitting holder for holding the fitting, a carrier for said fitting holder, means for mounting said holder so that it can be angularly adjusted, mounting means for mounting said fitting holder so as to be adjustable in two dimensions in a single plane, an adjustable carriage for permitting adjustment of said fitting holder and its mounting means at right angles to said plane, and a face plate on said fitting holder marked to indicate the centre of the fitting adapted for setting said fitting holder at predetermined positions relatively to said end holding devices.

4. Apparatus for assembling and securing together, converging bracing members the axes of which meet at a point, a fitting at said meeting point tubular members, gusset plates for fixing said bracing members to the tubular members, and strengthening sleeves for the tubular members, comprising two face plates, means for supporting the gusset plates and strengthening sleeves against said face plates with faces of the gusset plates flush with the faces of said face plates, means for effecting three dimensional rectilinear adjustment between the face plates, means for effecting angular adjustment of the face plates to change their relative inclination, a fitting holder for said fitting and adjustable mounting means for said fitting holder whereby it is adjustable in a transverse plane situated between said two face plates.

5. Apparatus for assembling and securing together, converging bracing members the axes of which meet at a point, a fitting at said meeting point tubular members, gusset plates for fixing said bracing members to the tubular members, and strengthening sleeves for the tubular members, comprising two face plates, means for supporting the gusset plates and strengthening sleeves against said face plates with faces of the gusset plates flush with the faces of said face plates, means for effecting three dimensional rectilinear adjustment between the face plates, means for effecting angular adjustment of the face plates to change their relative inclination, a fitting holder for said fitting, a carrier for said fitting holder, means for mounting said holder so that it can be angularly adjusted, means for mounting said fitting holder so that this holder can be adjusted in a transverse plane situated between said two face plates, an adjustable carriage for permitting adjustment of said mounting means at right angles to said plane, and a face plate on said fitting holder for setting it to predetermined positions relatively to said face plates.

6. Apparatus for assembling and securing together, converging bracing members the axes of which meet at a point, a fitting at said meeting point tubular members, gusset plates for fixing said bracing members to the tubular members, and strengthening sleeves for the tubular members, comprising, in combination, a bed, two headstocks, face plates mounted on said headstocks, means for supporting the strengthening sleeves and gusset plates against said face plates with faces of the gusset plates flush with the faces of said face plates, means for effecting relative movements of the headstocks along the bed, means for effecting relative movement between the face plates and the headstocks across the bed and perpendicular to the plane of the bed, means for effecting angular adjustment of each face plate about an axis through the centre of its face at right angles to the plane of the bed, a fitting holder for said fitting and means for mounting said fitting holder so that this holder is adjustable in a transverse plane situated between said face plates.

7. Apparatus for assembling and securing together, converging bracing members the axes of which meet at a point, a fitting at said meeting point tubular members, gusset plates for fixing said bracing members to the tubular members, and strengthening sleeves for the tubular members, comprising in combination, a bed, two headstocks, face plates mounted on said headstocks, means for supporting the strengthening sleeves and gusset plates against said face plates with faces of the gusset plates flush with the faces of said face plates, means for effecting relative movements of the headstocks along the bed, means for effecting relative movement between the face plates and the headstocks across the bed and perpendicular to the plane of the bed, means for effecting angular adjustment of each face plate about an axis through the centre of its face at right angles to the plane of the bed, a fitting holder for said fitting, means for mounting said fitting holder so that it is angularly adjustable, means for carrying said fitting holder so that it is adjustable in a transverse plane situated between said face plates, and means for mounting said fitting holder and its carrying means so that it is adjustable parallel to the bed.

8. Apparatus for assembling and securing together, converging bracing members the axes of which meet at a point, a fitting at said meeting point tubular members, gusset plates for fixing said bracing members to the tubular members, and strengthening sleeves for the tubular members, comprising, in combination, a bed, two headstocks, face plates mounted on said headstocks, means for supporting the strengthening sleeves and gusset plates against said face plates with faces of the gusset plates flush with the faces of said face plates, means for effecting relative movements of the headstocks along the bed, means for effecting relative movement between the face plates and the headstocks across the bed and perpendicular to the plane of the bed, means for effecting angular adjustment of each face plate about an axis through the centre of its face at right angles to the plane of the bed, a fitting holder for said fitting, parallel linkage mechanism carrying said fitting holder whereby said fitting holder is adjustable in a transverse plane situated between said face plates and means for fixing said links in any adjusted position.

9. Apparatus for assembling and securing together, converging bracing members the axes of which meet at a point, a fitting at said meeting point, tubular members, gusset plates for fixing said bracing members to the tubular members, and strengthening sleeves for the tubular members, comprising, in combination, a bed, two headstocks, headstock face plates mounted on said headstocks, means for supporting the strengthening sleeves and gusset plates against said headstock face plates with faces of the gusset plates flush with the faces of said headstock face plates, means for effecting relative movements of the headstocks along the bed, means for effecting relative movement between the headstock face plates and the headstocks across the bed and perpendicular to the plane of the bed, means for effecting angular adjustment of each headstock face plate about an axis through the centre of its face at right angles to the plane of the bed, gauge faces on each headstock for the reception of gauges for determining the distance between said headstock face plates measured along the bed, across the bed and at right angles to the plane of the bed respectively, a fitting holder for said fitting and means for permitting said fitting holder so that it is adjustable in a transverse plane situated between said headstock face plates and a fitting face plate on said holder marked to indicate the centre of the fitting for determining the position of the fitting holder relative to the headstock face plates.

10. Apparatus for assembling and securing together, converging bracing members the axes of which meet at a point, a fitting at said meeting point, tubular members, gusset plates for fixing said bracing members to the tubular members, and strengthening sleeves for the tubular members, comprising in combination, a bed, two headstock face plates mounted on said headstocks, means for supporting the gusset plates and strengthening sleeves against said face plates with faces of the gusset plates flush with the faces of the said headstock face plates, means for effecting relative movements of the headstocks along the bed, means for effecting relative movement between the headstock face plates and the headstock across the bed and perpendicular to the plane of the bed, means for effecting angular adjustment of each headstock face plate about an axis through the centre of its face at right angles to the plane of the bed, gauge faces on each headstock for the reception of gauges for determining the distance between said headstock face plates measured along the bed, across the bed, and at right angles to the plane of the bed respectively, a fitting holder for said fitting, means for mounting means for permitting said fitting holder whereby it is adjustable in a transverse plane situated between said headstock face plates, means for mounting said fitting holder so that it is adjustable angularly, a carriage for said mounting means adapted to permit the fitting holder to be adjusted parallel to the bed of the machine, gauge faces on said carriage and bed for the reception of gauges for determining the distance between the fitting holder parallel to the bed, and a fitting face plate on said holder marked to indicate the centre of the fitting for determining the positions of the fitting holder transversely of said bed.

11. Apparatus for assembling and securing together converging bracing members, the axes of which meet at a point, a fitting at said meeting point, tubular members and gusset plates for attachment of the bracing members to the tubular member, comprising end holding devices for the tubular member and gusset plates, said holding devices being relatively adjustable and adapted to be fixed in any adjusted position, a holding device for the fitting, means carrying said fitting holding device adapted to allow two dimensional adjustment of the holding device in a single plane.

BARNES NEVILLE WALLIS.